US010406457B2

(12) United States Patent
Bautz et al.

(10) Patent No.: US 10,406,457 B2
(45) Date of Patent: Sep. 10, 2019

(54) FILTER DEVICE (71) Applicant: RT-FILTERTECHNIK GMBH, Friedrichshafen (DE)

(72) Inventors: Marco Bautz, Friedrichshafen (DE); Gerhard Stehle, Constance (DE)

(73) Assignee: RT-FILTERTECHNIK GMBH, Friedrichshafen (DE)

( * ) Notice: Subject to any disclaimer, the term of this patent is extended or adjusted under 35 U.S.C. 154(b) by 105 days.

(21) Appl. No.: 15/553,631

(22) PCT Filed: Apr. 19, 2016

(86) PCT No.: PCT/EP2016/000631
§ 371 (c)(1),
(2) Date: Aug. 25, 2017

(87) PCT Pub. No.: WO2016/198136
PCT Pub. Date: Dec. 15, 2016

(65) Prior Publication Data
US 2018/0043290 A1 Feb. 15, 2018

(30) Foreign Application Priority Data
Jun. 9, 2015 (DE) .................. 10 2015 007 691

(51) Int. Cl.
*B01D 29/23* (2006.01)
*B01D 35/027* (2006.01)
(Continued)

(52) U.S. Cl.
CPC ........... *B01D 29/232* (2013.01); *B01D 29/21* (2013.01); *B01D 29/58* (2013.01);
(Continued)

(58) Field of Classification Search
CPC ...... B01D 29/232; B01D 29/58; B01D 29/21; B01D 35/147; B01D 35/0276
See application file for complete search history.

(56) References Cited

U.S. PATENT DOCUMENTS

2016/0023145 A1 1/2016 Greco et al.
2018/0043290 A1* 2/2018 Bautz ................. B01D 35/0276

FOREIGN PATENT DOCUMENTS

EP 0 874 675 11/1998
EP 2 377 591 10/2011
(Continued)

OTHER PUBLICATIONS

International Search Report (ISR) dated Jul. 1, 2016 in International (PCT) Application No. PCT/EP2016/000631.

*Primary Examiner* — Chester T Barry
(74) *Attorney, Agent, or Firm* — Wenderoth, Lind & Ponack, L.L.P.

(57) ABSTRACT

A filter device has a support part (39, 43) receiving a filter part (1), a sealing device (17) acting between the support part (39, 43) and the filter part (1), and a securing device (53, 57, 61) releasably connecting the support part (43) to the filter part (1). The securing device has a circumferential collar part (53) that, under the action of an energy store (61), exerts a force on the sealing device (17). That force seals the support part (39, 43) and the filter part (1) in a fluid-tight manner with respect to one another. The support part (39, 43) has, on its end region oriented toward the securing device (53, 57, 61), another circumferential collar part (39). The collar part (53) of the securing device (53, 57, 61) is guided concentrically within the collar part (39) of the support part (39, 43) provided with a sealing system (41, 72).

20 Claims, 8 Drawing Sheets (51) Int. Cl.
*B01D 35/147* (2006.01)
*B01D 29/21* (2006.01)
*B01D 29/58* (2006.01)

(52) U.S. Cl.
CPC ....... *B01D 35/0276* (2013.01); *B01D 35/147* (2013.01); *B01D 2201/122* (2013.01); *B01D 2201/291* (2013.01); *B01D 2201/342* (2013.01); *B01D 2201/4015* (2013.01); *B01D 2201/4053* (2013.01)

(56) References Cited

FOREIGN PATENT DOCUMENTS

| | | | |
|---|---|---|---|
| WO | 2005/007267 | 1/2005 | |
| WO | WO-2005007267 A1 * | 1/2005 | ............. B01D 29/21 |
| WO | 2014/165606 | 10/2014 | |

* cited by examiner

FILTER DEVICE

FIELD OF THE INVENTION

The invention relates to a filter device having a support part and filter part that can be received therein. At least one sealing mechanism acts between the support part and the filter part. A securing mechanism releasably connects the support part to the filter part, which securing mechanism has a circumferential collar part and which, under the action of at least one energy store, exerts a force on the sealing mechanism that seals the support part and the filter part in a fluid tight manner with respect to one another. The support part has, at least on its end region oriented toward the securing mechanism, another circumferential collar part.

BACKGROUND OF THE INVENTION

A filter device of this generic type is disclosed in EP 0874 675 B1. For generating the force that acts on the sealing mechanism, the securing mechanism in this prior art filter device has a tie rod that passes from the open end of the filter element, coaxially to the longitudinal axis of the device, entirely through the filter part and the support part. On the free end of the tie rod that passes through the associated end cap, a first energy store is provided that pulls the support part against a collar part of the securing mechanism, which is in turn secured on the outer housing of the device by a second energy store. The operational safety of this device leaves much to be desired for several reasons. First, the transfer of the spring force of the first energy store to the end surface of the end cap, even if the end cap is made of metal, is critical because of the deformation risk resulting from the increased sealing force. Second, it is difficult to seal the place where the tie rod passes through. Third, if the long tie rod is pulled diagonally, there is a risk of the entire support part tilting, resulting in a correspondingly non-uniform transfer of force to the collar part of the securing mechanism to result in a correspondingly compromised sealing.

SUMMARY OF THE INVENTION

On the basis of this prior art, an object of the invention is to provide an improved filter device of the aforementioned generic type, which is distinguished by improved operating performance, particularly in terms of improved sealing.

According to the invention, this object is basically achieved by a filter device that has, as an essential feature of the invention, the collar part of the securing mechanism being guided concentrically within the collar part of the support part provided with a sealing system. Because an axial guide is formed in this manner for the component that directly transfers the sealing force, an optimum transfer of the force acting in the axial direction to the filter part is guaranteed, thereby in turn assuring optimum sealing.

The arrangement can be advantageously made such that in the filtering mode of the device, the energy store applies the collar part of the securing mechanism with a presettable sealing force against a sealing element of the adjacently arranged one end cap of the filter part. A second energy store, such as the one required in the aforementioned prior art solution for securing the collar part of the securing mechanism to the device housing, then becomes superfluous.

In particularly advantageous exemplary embodiments, the one end cap allocated to the collar parts moves the other end cap of the filter part, via the filter medium under the action of the energy store, against the sealing mechanism that acts between the support part and the filter part, resulting in an increased effect of the sealing force. As a result, the force generated by the only energy store present is applied as a sealing force on both end caps.

Furthermore, the arrangement can advantageously be made such that the action of the energy store of the securing mechanism is transferred via the sealing mechanism between the filter part and the support part to the collar part of the support part, which abuts with at least parts of its sealing system on housing parts of a receiving housing for the support part and the filter part together with the securing mechanism, resulting in an increased effect of the sealing force. Not only are the support part and the filter part kept under sealing contact force by the force of the energy store, but by the energy store the composite formed from these parts is also secured in the device housing concerned.

In particularly advantageous exemplary embodiments, the sealing mechanism that acts between the support part and the filter part is arranged, in particular molded, on the other end cap of the filter part. This sealing mechanism presses on an adjacently arranged end cap of the support part under the action of the energy store of the securing mechanism.

The arrangement can be made particularly advantageously such that the collar part of the support part is graduated and such that the inwardly folded, in particular inwardly crimped, end of a perforated support tube of the support part rests on a step of this collar part. A positive fit is then formed in a simple manner, which fit secures the collar part against being lifted from the support part.

With particular advantage, the collar part of the support part can be provided, on its inner circumference, with another sealing mechanism as part of the sealing system, against which other sealing mechanism the collar part of the securing mechanism, which is graduated in a manner corresponding to the collar part of the support part, rests in sealing contact.

In a particularly advantageous manner, the geometry in the area of the graduated surface sections of the two collar parts can be dimensioned such that, in the filtering mode of the device and with all sealing mechanisms exerting a sealing effect, when viewed in the axial direction parallel to the longitudinal axis of the filter device, essentially a virtually force-free contact is between each of the correspondingly graduated inner wall surfaces of the two collar parts, which collar parts are guided concentrically into each other. A clearance for a relative axial movement between the collar parts is then provided for transferring the sealing force supplied by the energy store and acting on the collar part of the securing mechanism to each of the downstream sealing mechanisms for forming seals between the securing part, the filter part, and the support part.

In particularly advantageous exemplary embodiments, the collar part of the securing mechanism has outwardly oriented latching bolts projecting above its upper edge that, as the securing mechanism, is twisted with respect to the support part, and can be brought into lateral engagement with assignable latching hooks of the other collar part. The axial extension of the latching bolts is dimensioned in such a way that the latching bolts in engagement with the latching hooks are guided in a contact-free manner. With a latching mechanism so configured and including the latching bolts and latching hooks, an axial clearance necessary for the transfer of force onto the sealing system is still available even with the latching bolts and latching hooks in the engaged state.

In particularly advantageous exemplary embodiments, the collar part of the support part has, at least partly adjacent to the free opening of the latching hooks, a control cam. The control cam is provided with a ramp-shaped rise to facilitate the disengagement of the filter part from the support part. To this end, the cam ramps allocated to a given latching bolt can be arranged and formed in such a way that as the securing mechanism is twisted, an axial motion component via which the two collar parts are moved apart in the axial direction is imparted to the latching bolts.

A tank device has a tubular housing part, into which a filter device according to the configuration of the invention can be inserted via a housing opening.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

With reference to the drawings, the filter device of the invention is explained using an in-tank filter device as an example. The filter device receives a filter element 1 in a relatively thin-walled, circular cylinder-shaped filter housing 25. Filter housing 25 has on its upper end a flange part 27, securing the filter housing on an upper tank opening (not illustrated) in such a way that the lower open end 29 of the filter housing 25 extends into the tank concerned up to a height that lies below the operating fluid level. On the upper end, the housing 25 can be closed with a lid 32 screwed to the flange part 27. At a short distance from the flange part 27, a supply pipe 31 opens into the housing 25 via an inlet opening 33.

Figure 1:
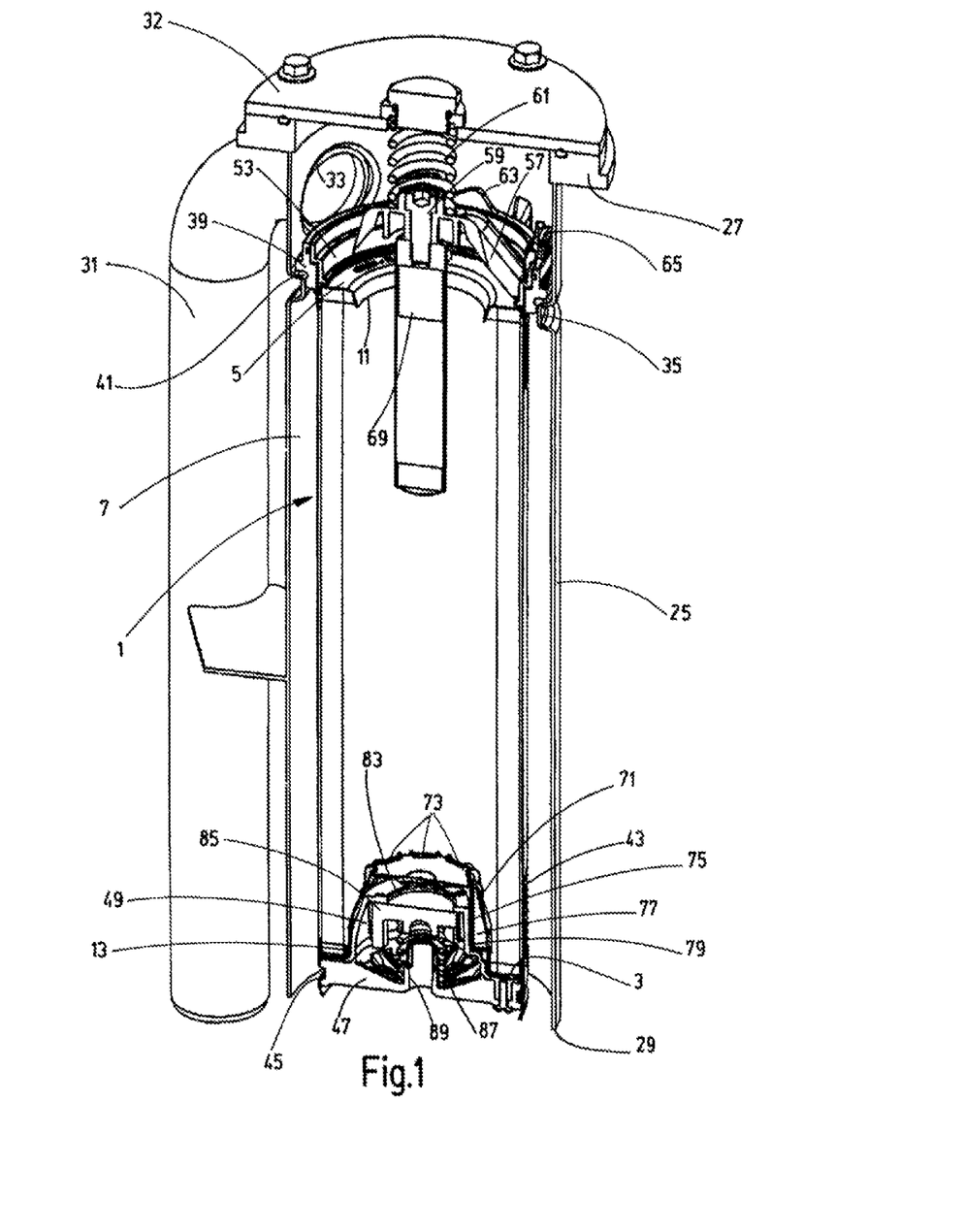
FIG. 1 is a perspective view in section of a filter device according to an exemplary embodiment of the invention.
Figure 2:
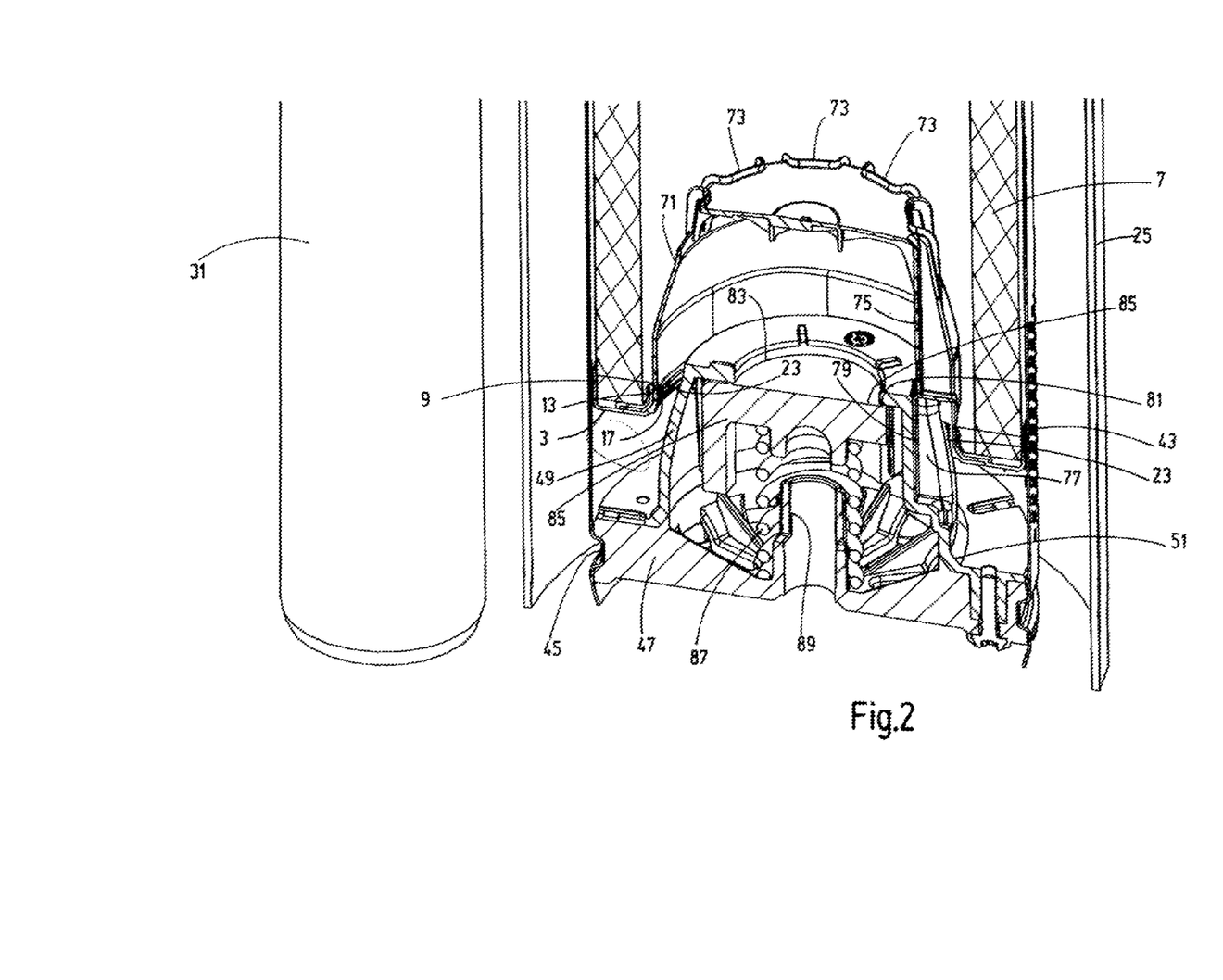
FIG. 2 is a partial perspective view in section of the lower end region of the filter device of FIG. 1, drawn to a larger scale relative to FIG. 1.
Figure 3:
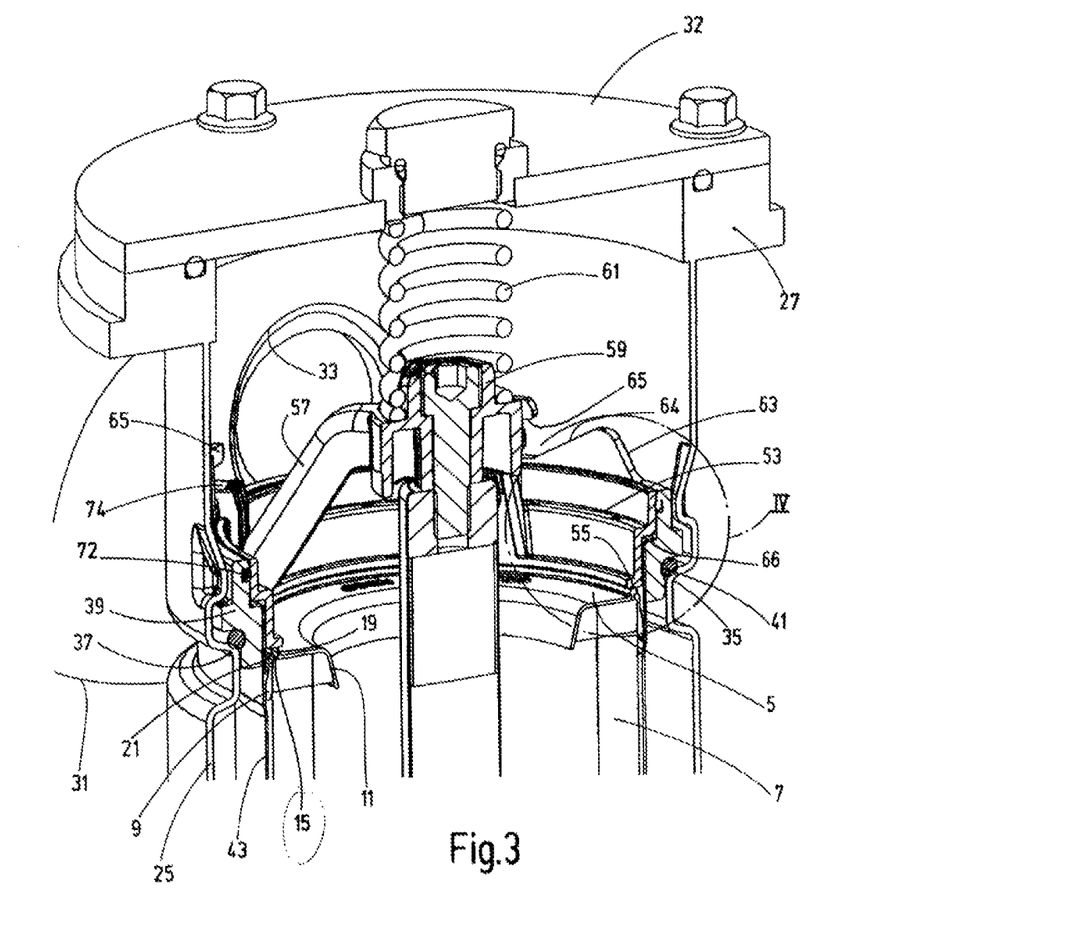
FIG. 3 is a partial perspective view in section of the upper end region of the filter device of FIG. 1, drawn to the scale of FIG. 2.

As can be clearly discerned in FIGS. 2 and 3, the filter element 1 has a lower end cap 3 and an upper end cap 5. As FIG. 2 shows most clearly for the end cap 3, the end caps 3, 5 form the enclosure for the respective ends of a filter material 7 that forms a hollow cylinder, which in this example has the form of a folded mesh pack. Both end caps 3 and 5 have a circular outer rim 9, on which the outside of the filter material 7 rests in the example shown. However, the filter material 7 does not necessarily have to rest on a rim of the end caps 3, 5. The upper end cap 5 likewise has a circular inner rim 11, the lower end cap 3 has an inner rim 13 in the shape of a polygon, namely a Reuleaux triangle in the example shown. The non-circular connection area on the end cap 3 can be used to safeguard against incorrect installation, as a matching non-circular geometry is provided for the connection area provided on the filter device for the end cap 3, thus assuring that the fluid coupling connection between the filter element and the filter device can only be made if the geometries of the right filter element 1 and the connection area of the end cap 3 match.

Both end caps 3 and 5 each have a circumferential seal 17 and 15, respectively, which seals are molded from an elastic material onto the rigid material that forms the end caps 3, 5. As FIG. 3 shows, the seal 15 for the upper end cap 5 is molded in such a way that it forms an axial sealing surface 19, configured as sloping down via an inclined plane 21 towards the outer circumference of the upper end cap 3. The seal 17 of the lower end cap 3 is molded in such a way that at least one radial sealing edge 23 is formed. As can be discerned in FIGS. 2 and 3, which illustrate the situation with the filter element 1 being installed in the filter device, the sealing surfaces 19 and 23 are used to form seals on the securing parts, by which the filter element 1 can be positioned in the filter device of the invention.

Below the inlet opening 33, an inward crimp 35 is formed in the wall of the filter housing 25, which inward crimp is shaped such that a step or flank 37 is formed on a radially recessed area (FIG. 3), on which a collar part (which has the shape of a graduated annular body 39) of the support part of the device is braced by a seal 41 against downward axial movement. As shown in FIG. 3, the graduated annular body 39, which forms the collar part of the support part of the device, is connected to a perforated support tube 43 of the support part. The support tube 43, on which rests the outside of the filter material 7 of the filter element 1, extends to the lower open end of the filter housing 25. As FIG. 2 shows, an inward crimp 45 is provided on the lower end of the support tube 43, by which a rigid bottom part 47 is connected to the support tube 43. In combination with the annular body 39 and the bottom part 47, the support tube 43 serving as a component of the support part then forms an inner housing for the filter element 1, which can be inserted from above. As the filter element 1 is being inserted, i.e., moved axially downward from the partially inserted position shown in FIG. 2, the bottom part 47, together with a bypass valve housing 49 connected thereto, forms a lower securing part for the lower end cap of the filter element 1.

As already indicated, in order to form a sort of key/lock system, the outer circumference of the bypass valve housing 49 has a polygonal shape in the contact or sealing area 51 that corresponds to the Reuleaux triangle on the inner rim 13 of the end cap 3, see FIG. 2. If the polygonal shapes of the inner rim 13 of the end cap 3 and the outer circumference of the bypass valve housing 49 that forms the sealing area 51 serving as the lower securing part of the filter device do not match, the filter element 1 cannot be moved into the engaged functional position. An effective fail-safe mechanism is then formed that prevents an improper filter element 1 that is not suited for the intended use from being put into operation.

Another collar part associated with the securing mechanism keeps the filter element 1 in the installed functional position on the lower securing part, i.e. the bottom part 47 with the bypass valve housing 49. A retaining ring 53 is provided that engages in the graduated inner circumference of the annular body 39 that forms the collar part of the support part. Retaining ring 53 has a graduated shape corresponding to the inside of the annular body 39. In its functional position, retaining ring 53 rests with its inner, lower end rim 55 on the sealing surface 19 of the end cap 5. One-piece bars 57 extend radially inwardly in an upwardly inclined manner from the inside of the retaining ring 53 to a centrally located spring bearing 59 supporting a compression spring 61. The other end of spring 61 rests in contact on the housing lid 32. Spring 61 then exerts a downward axial pretensioning force on the retaining ring 53 and generates the sealing force with which the end rim 55 rests in contact on the sealing surface 19 of the end cap 5.

Figure 4:
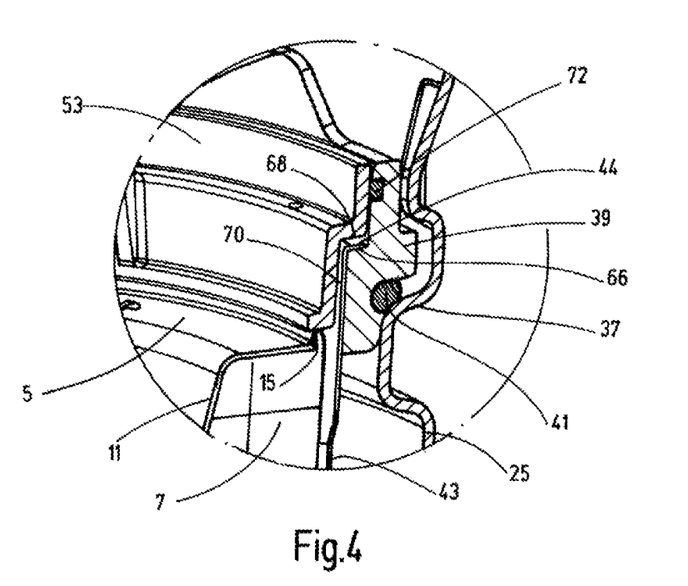
FIG. 4 is a partial perspective view in section of a detail of the area designated by IV in FIG. 3, magnified in relation to FIG. 3.

As already mentioned, the support tube 43, in combination with the bottom part 47 connected thereto on the lower end by the inward crimp 45, forms an inner housing for the filter element 1. The bottom part 47 forms a securing part for the filter part. As can best be discerned from FIG. 4, the upper end of the support tube 43 has an outwardly angled rim 44, which rests on a step 66 on the inside of the annular body 39 serving as a collar part of the support part. The inner housing formed by the support tube 43 is then braced against the sealing force generated by the compression spring 61, which force is transferred from the end rim 55 of the retaining ring 53 to the upper end cap 5 and via the filter element 1 to the lower end cap 3, and from the lower end cap 3 in turn to the bottom part 47 serving as the lower securing part, on the annular body 39. The annular body 39 is in turn secured in a sealing manner via the ring seal 41 on the recessed flank 37 of the filter housing 25. In order to assure an unobstructed transfer of the sealing force from the retaining ring 53 serving as a collar part of the securing part to the upper end cap 5, the dimensions of the retaining ring 53 and the annular body 39 serving as a collar part of the support part, as well as the position of the steps 66, 68 formed thereon, are selected in such a way that in the installation state, as shown most clearly in FIG. 4, there is an axial clearance between the step 66 on the annular body 39 and the opposite step 68 on the retaining ring 53. The axial clearance serves as space for a relative axial movement. In the area adjoining the steps 66, 68 in an axially downward direction, there is likewise a radial clearance 70 between the annular body 39 and the retaining ring 53. A suitable guide, on which a ring seal 72 forms the sealing area, is formed only in the area adjoining the steps 66, 68 in the upward direction between the annular body 39 and the retaining ring 53. The sealing force generated by the compression spring 61 then acts via the filter element 1 as an axial force, which is transferred from the upper rim 44 of the support tube 43 to the annular body 39 and via the annular body 39 in turn to the ring seal 41, which rests on the flank 37 of the housing 25.

Figure 5:
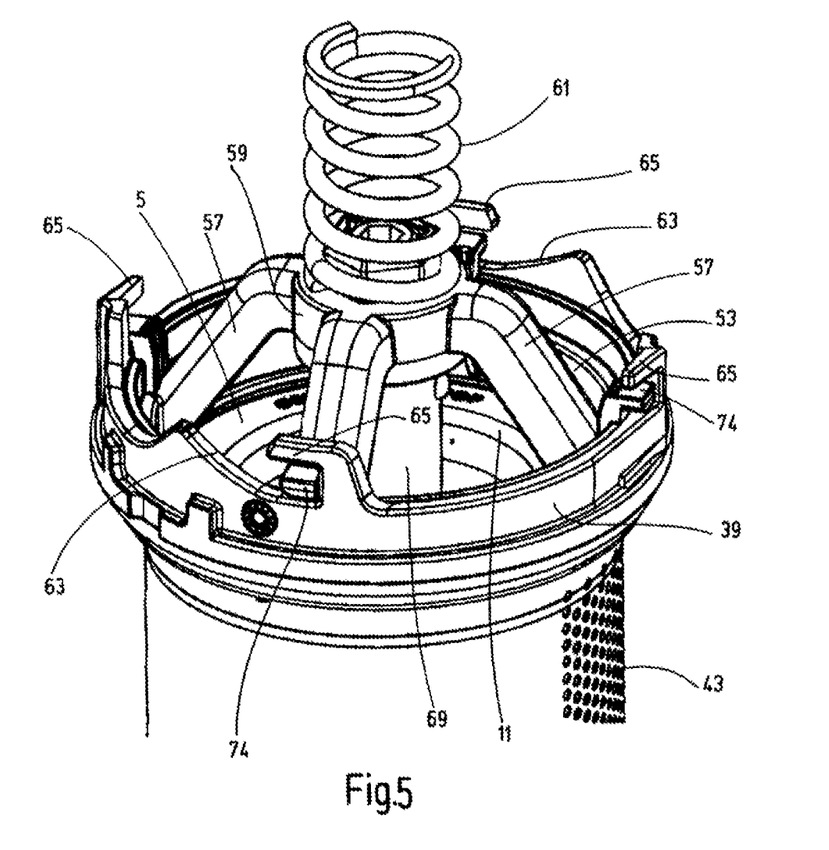
FIG. 5 is an incomplete perspective view of the area of the collar parts of the support part and of the securing mechanism of the filter device of FIG. 1.

As can be discerned most clearly from FIGS. 5-8, provision is made of a plurality of cam tracks 63 on the upper circumferential rim of the annular body 39. To each cam track 63, a latching hook 65 is attached and extends above the end of the associated cam track 63 in the circumferential direction. To interact with these latching hooks 65, radially outwardly projecting latching bolts 74 are provided on the upper rim of the retaining ring 53 that forms the collar part of the securing mechanism. FIG. 5 shows the installed state, in which the sealing force generated by the compression spring 61 is effective. The latching bolts 74 are at the lowest point of the cam tracks 63 under the hooks 65, although there is still an axial clearance between the latching bolts 74 and the given cam track 63 so that the elastic force of the compression spring 61 is not exerted by the latching bolts 74 on the retaining ring 53, which is secured in the axial direction on the flank 67 of the housing 25. Instead, the elastic force of spring 61 is exerted without obstruction on the annular body 39, which is decoupled from the retaining ring 53 in terms of axial movements by the clearance that exists between the steps 66 and 68.

Figure 6:
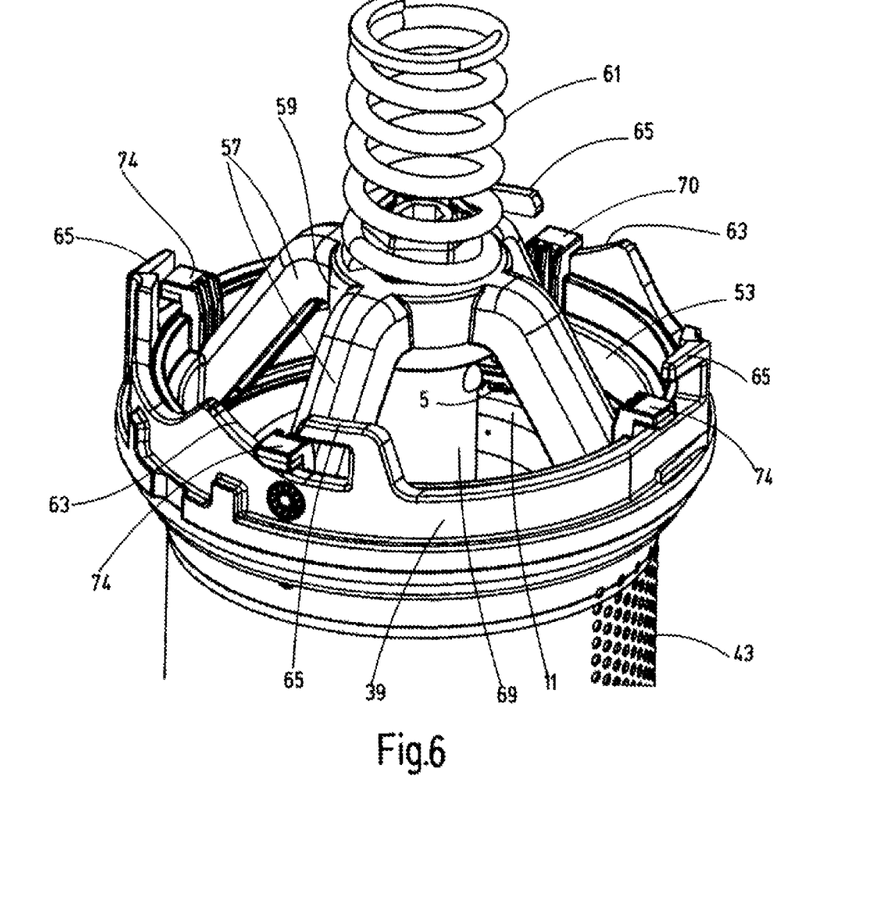
FIGS. 6-8 are incomplete perspective views corresponding to FIG. 5 of the filter device of FIG. 1, in which different movement phases of the securing mechanism during the release of the connection between the collar parts are depicted.
Figure 7:
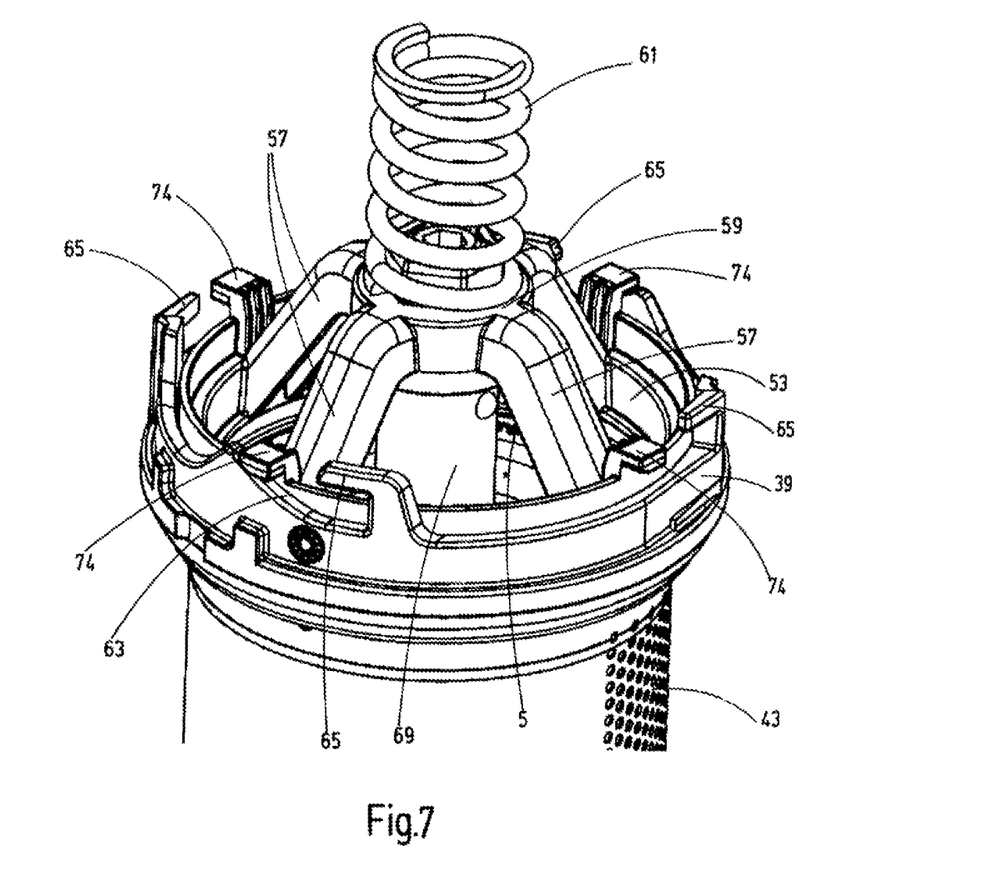
Figure 8:
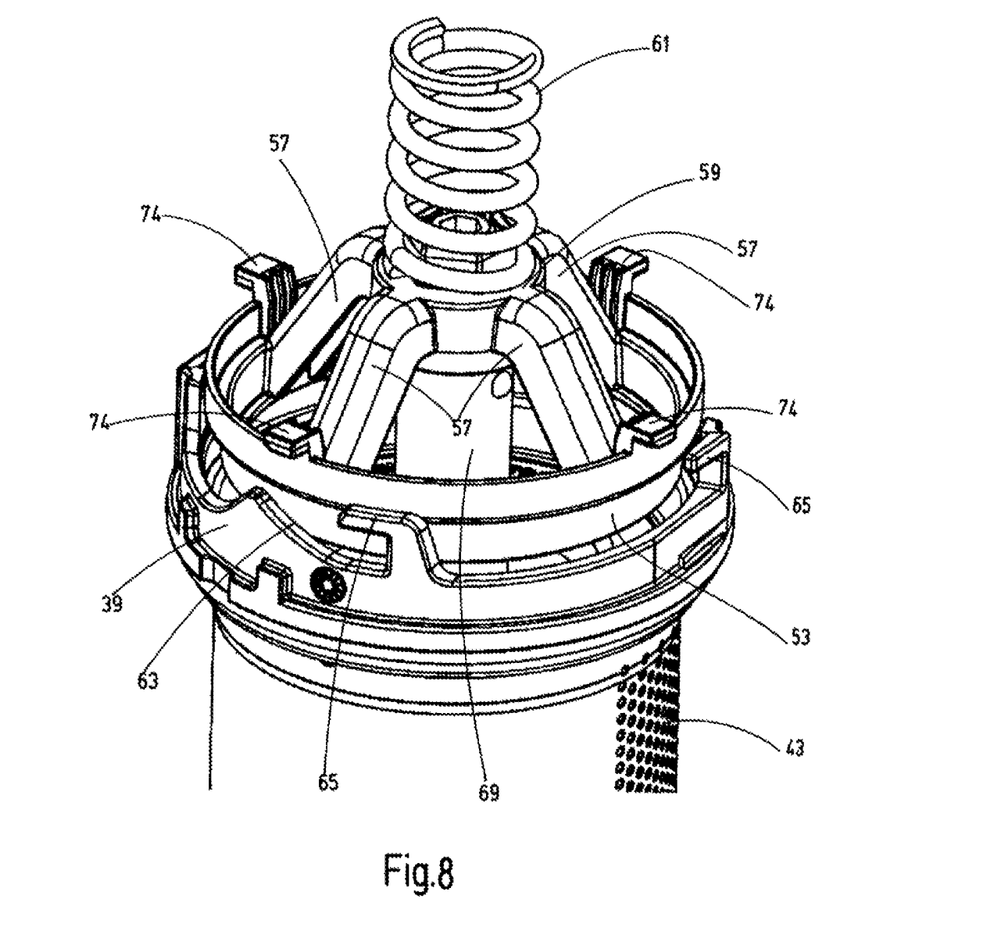

If the housing lid 32 is loosened, the compression spring 61 is decompressed so that the securing mechanism can be removed without any tension, for example in order to take the filter element 1 out of the inner housing of the support part in order to change it. In order to keep the support part, i.e. the inner housing with the support tube 43 plus the annular body 39 forming its collar part, in the housing 25, the retaining ring 53 and the annular body 39 must be moved apart axially. This movement can be effected in an expedient manner by turning the latching bolts 74 clockwise by a clockwise rotary movement of the bars 57 with the retaining ring 53. The latching bolts are forcibly actuated in axially upward movement along the cam tracks 63. A relative axial movement then takes place between the retaining ring 53 and the annular body 39. It is furthermore possible to effect the rotary movement by a tool such as a ratchet wrench, which engages on a hex head to which the spring 61 is also coupled. The sequential movement phases of this rotary movement are shown in FIGS. 6 and 7. Any friction acting between these collar parts 39, 53 in the guide zone sealed by the seal 72 is then overcome in an expedient manner. The cam tracks 63 and the latching bolts 74 interact in this way to form an aid for dismantling the filter element 1. The entire securing mechanism 53, 57, 61 along with a permanent magnetic bar 69, which is mounted on the spring bearing 59 and which extends therefrom in the axial direction into the interior of the filter element 1, can then be removed in an expedient manner (cf. FIG. 8).

As can be discerned most clearly in FIG. 2, the lower end cap 3 has an inner body in the shape of a dome 71, which starting from the polygonally-running inner rim 13, extends axially into the interior filter cavity and has a ring of fluid openings 73 on its upper end. On the inside, the dome 71 forms a fillet 75 that extends in the axial direction by a recessed wall region. The bypass valve housing 49, which extends into the dome 71 when the filter element 1 is in its inserted operating position, has an external shape that corresponds to the internal shape of the dome 71 and has on its outside a channel-shaped wall recess 77, which forms a sliding surface 79 (see FIG. 2), along which the fillet 75 of the dome 71 is guided when the filter element 1 is pushed downwards from the starting position shown in FIG. 2 and into the operating position. The fillet 75, in combination with the sliding surface 79 on the recess 77 of the bypass valve housing 49, then forms a rotary positioning mechanism, which aligns the polygon on the inner rim 13 of the end cap 3 congruently to the polygonal shape on the sealing area 51 of the bypass valve housing 49. The bypass valve housing 49 forms, on the inner rim 81 of an upper housing opening 83, a valve seat for the seating of a valve body 85 of the bypass valve. The valve body 85 is pretensioned by a valve spring 87, which is mounted on a connecting piece 89 located on the bottom part 47. With the filter element 1 installed, the outer wall of the valve housing 49 furthermore forms the sealing seat in conjunction with the lower ring seal 17 having a circumferential sealing edge 23 of the lower end cap 3.

With the filter element 1 in the filtration mode in the illustrated in-tank filter device, the fluid flows through the inlet opening 33 on the front side of the filter element 1 and reaches the inner filter cavity that forms the crude or non-filtrate side through the opening on the inner rim 11 of the end cap 5. After flowing through the filter material 7 from the inside to the outside to the clean or filtrate side in the space between the support tube 43 and the housing wall 25, the filtrate exits into the tank via the open lower end of the housing 25. Obviously, the filter element 1 cannot only be advantageously used with an in-tank filter device, but with all types of filter devices in which corresponding securing parts are provided for connections to end caps, the filter elements of which are shaped in a special non-circular manner.

Although a Reuleaux polygon is shown here, in which the polygonal shape is located on the lower end cap 3 and the connection area of the upper end cap 5 is circular cylindrical, both end caps 3 and 5 could each be provided with a different polygonal shape, or the lower end cap 3 could have a circular cylindrical connection geometry and the polygonal shape could be provided on the upper end cap 5. The polygonal connection geometry could be provided on an outer rim of one or both end caps or on the inner rim of one end cap and on the outer rim of the other end cap, rather than on the inner rim 13 of the end cap 3 as in the present example. Furthermore, use could be made of end caps having characteristic polygonal shapes that differ from one another.

While one embodiment has been chosen to illustrate the invention, it will be understood by those skilled in the art that various changes and modifications can be made therein without departing from the scope of the invention as defined in the claims.

The invention claimed is:

1. A filter device comprising:
a filter housing;
a filter part in said filter housing;
a support part in said filter housing receiving said filter part therein and being releasably connected to said filter part, said support part having a first circumferential collar part;
first seals acting between said support part and said filter part;
a securing mechanism on said filter part releasably connecting said support part to said filter part, said securing mechanism having a second circumferential collar part and an energy store exerting a biasing force on said first seals sealing said support part and said filter part fluid-tight relative to each other, said second circumferential collar part being guided concentrically within said first circumferential collar part; and
second seals of an end region of said support part facing said securing mechanism.

2. A filter device according to claim 1 wherein
said energy store applies said second circumferential collar part with a settable sealing force against a first sealing element of said first seals arranged adjacent a first end cap of said filter part in a filtration mode.

3. A filter device according to claim 2 wherein
said first end cap moves a second end cap of said filter part via a filter medium extending between and connecting said first and second end caps under action of said energy store against a second sealing element of said first seals between said support part and said filter part, resulting in an increased effect of a sealing force.

4. A filter device according to claim 3 wherein
the biasing force of said energy store is transferred via said second sealing element of said first seals between said filter part and said support part onto said first circumferential collar part, said first circumferential collar part abutting parts of said second seals on housing parts of said filter housing parts of said filter housing such that said support part, said filter part and said securing mechanism have an increased sealing force.

5. A filter device according to claim 3 wherein
said second sealing element of said first seals is on said second end cap, said second end cap pressing on an adjacent dome part of said support part under the biasing force of said energy store.

6. A filter device according to claim 1 wherein
said first circumferential collar part is graduated and comprises a step, said filter part including a perforated support tube with a radially outwardly extending rim resting on said step.

7. A filter device according to claim 6 wherein
said first circumferential collar part has a first sealing element of said second seals on an inner circumference of said first circumferential collar part, said first sealing element of said second seals contacting said second circumferential collar part.

8. A filter device according to claim 1 wherein
said first and second seals exert a sealing effect in axial direction parallel to a longitudinal axis of said filter housing, with a virtually force-free contact between corresponding inner wall surfaces of said first and second circumferential collar parts.

9. A filter device according to claim 1 wherein
said securing mechanism comprises radially outwardly extending latching bolts projecting above an upper rim of said second circumferential collar part, said latching bolts being twistable relative to said support part to engage with and disengage from respective latching hooks on said first circumferential collar part, said latching bolts and said latching hooks having axial extensions dimensioned such that engagement of said latching bolts with said latching hooks is guided in a contact-free manner under the biasing force of said energy store and is executed in an axial, force-transferring feed motion on said first seals of an end cap of said filter part.

10. A filter device according to claim 9 wherein
said first circumferential collar part comprises a control cam with a ramp-shaped rise adjacent a free opening of each of said latching hooks facilitating disengagement of said filter part from said support part.

11. A tank device comprising:
a tank with a housing opening closed by a tank lid;
a tubular filter housing inserted in said housing opening;
a filter part in said filter housing;
a support part in said filter housing receiving said filter part therein and being releasably connected to said filter part, said support part having a first circumferential collar part;
first seals acting between said support part and said filter part;
a securing mechanism on said filter part releasably connecting said support part to said filter part, said securing mechanism having a second circumferential collar part and a compression spring exerting a biasing force on said first seals sealing said support part and said filter part fluid-tight relative to each other, said tank lid exerting a force on said compression spring, said second circumferential collar part being guided concentrically within said first circumferential collar part; and
second seals of an end region of said support part facing said securing mechanism.

12. A tank device according to claim 11 wherein
said compression spring applies said second circumferential collar part with a settable sealing force against a first sealing element of said first seals arranged adjacent a first end cap of said filter part in a filtration mode.

13. A tank device according to claim 12 wherein
said first end cap moves a second end cap of said filter part via a filter medium extending between and connecting said first and second end caps under action of said compression spring against a second sealing element of said first seals between said support part and said filter part, resulting in an increased effect of a sealing force.

14. A tank device according to claim 13 wherein
the biasing force of said compression spring is transferred via said second sealing element of said first seals between said filter part and said support part onto said first circumferential collar part, said first circumferential collar part abutting parts of said second seals on housing parts of said filter housing parts of said filter housing such that said support part, said filter part and said securing mechanism have an increased sealing force.

15. A tank device according to claim 13 wherein
said second sealing element of said first seals is on said second end cap, said second end cap pressing on an adjacent dome part of said support part under the biasing force of said energy store.

16. A tank device according to claim 11 wherein
said first circumferential collar part is graduated and comprises a step, said filter part including a perforated support tube with a radially outwardly extending rim resting on said step.

17. A tank device according to claim 16 wherein
said first circumferential collar part has a first sealing element of said second seals on an inner circumference of said first circumferential collar part, said first sealing element of said second seals contacting said second circumferential collar part.

18. A The filter device according to claim 11 wherein
said first and second seals exert a sealing effect in axial direction parallel to a longitudinal axis of said filter housing, with a virtually force-free contact between corresponding inner wall surfaces of said first and second circumferential collar parts.

19. A filter device according to claim 11 wherein
said securing mechanism comprises radially outwardly extending latching bolts projecting above an upper rim of said second circumferential collar part, said latching bolts being twistable relative to said support part to engage with and disengage from respective latching hooks on said first circumferential collar part, said latching bolts and said latching hooks having axial extensions dimensioned such that engagement of said latching bolts with said latching hooks is guided in a contact-free manner under the biasing force of said energy store and is executed in an axial, force-transferring feed motion on said first seals of an end cap of said filter part.

20. A filter device according to claim 19 wherein
said first circumferential collar part comprises a control cam with a ramp-shaped rise adjacent a free opening of each of said latching hooks facilitating disengagement of said filter part from said support part.

* * * * *